United States Patent [19]

Chandler et al.

[11] 3,912,818

[45] Oct. 14, 1975

[54] PROCESS FOR PRODUCING MODIFIED PROTEIN

[75] Inventors: Keith L. Chandler, Barrington; Roy G. Hyldon, Crystal Lake; John P. O'Mahony, Barrington, all of Ill.

[73] Assignee: The Quaker Oats Company, Chicago, Ill.

[22] Filed: June 12, 1974

[21] Appl. No.: 478,753

[52] U.S. Cl. .................. 426/44; 426/46; 426/49; 426/52; 426/60
[51] Int. Cl.² .................. A23J 3/00; A23L 1/36
[58] Field of Search ............ 426/44, 46, 18, 49, 52, 426/60

[56] References Cited
UNITED STATES PATENTS

| | | | |
|---|---|---|---|
| 2,502,482 | 4/1950 | Sair et al. | 426/46 |
| 3,170,802 | 2/1965 | Fukushima | 426/46 |
| 3,694,221 | 9/1972 | Hoer et al. | 426/46 |
| 3,810,997 | 5/1974 | Chien | 426/49 X |
| 3,852,480 | 12/1974 | Williams | 426/46 |

Primary Examiner—Raymond N. Jones
Attorney, Agent, or Firm—Donnie Rudd

[57] ABSTRACT

A process is disclosed for producing a modified vegetable protein having thermoplastic and forming properties similar to casein and caseinate salts. The process comprises making an aqueous slurry of a carbohydrate containing vegetable protein material, fermenting the slurry with yeast to generate carbon dioxide, reacting the carbon dioxide with a hydroxide to form a carbonate, adjusting the pH, heating the slurry, neutralizing the slurry, and then drying the neutralized slurry.

10 Claims, No Drawings

PROCESS FOR PRODUCING MODIFIED PROTEIN

BACKGROUND OF THE INVENTION

1. Field of the Invention

This invention relates to a process for producing a modified vegetable protein having properties similar to casein and caseinate salts. The process involves the production of carbon dioxide by a yeast-sugar reaction, the conversion of it to a carbonate, and the reaction of the carbonate with the vegetable protein material.

2. Description of the Prior Art:

Many attempts have been made to produce modified vegetable protein having the properties of casein or caseinate salts. In recent years casein and caseinate salts such as sodium caseinate have become very expensive due to many economic factors. Casein and sodium caseinate, however, have some exceptional properties which have not been suitably duplicated heretofore by modified vegetable proteins. For instance, sodium caseinate has excellent binding and thermoplastic properties as well as having a good protein equivalency. The combination of protein content and thermoplastic forming and binding properties makes sodium caseinate and casein unique. This invention is the first known process for producing an acceptable modified vegetable protein which can be utilized as a substitute for casein and caseinate salts and which has the thermoplastic and forming properties of casein and caseinate salts.

SUMMARY OF THE INVENTION

It is an object of this invention to provide a process for producing a modified vegetable protein having the properties of casein and caseinate salts.

The objects of this invention are accomplished by a process for producing a modified vegetable protein having properties similar to casein and caseinate salts, said process comprising:

A. making an aqueous slurry of a carbohydrate containing vegetable protein material, said vegetable protein material containing at least about 30 percent by weight protein;
B. fermenting the slurry with yeast to generate carbon dioxide;
C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5;
D. heating the aqueous slurry to react the carbonate with the protein;
E. neutralizing the slurry to a pH of from about 6.6 to 7.0 by addition thereto of an edible acid or edible alkali; and
F. drying the neutralized slurry to remove a substantial portion of the water therein.

Preferably, the process includes a cooling step, say from room temperature, to 130°F., after the heating-reacting and prior to neutralization.

More preferably the protein material of this invention is a solvent extracted oil seed vegetable protein.

Preferably also, the aqueous slurry of this invention has a solids content of about 3 percent to about 20 percent by weight, but depending upon protein in the solids should provide up to about 12 percent by weight protein in the slurry.

The preferred hydroxide of this invention is a member selected from the group comprising sodium hydroxide, potassium hydroxide, and ammonium hydroxide.

The preferable reaction temperature of this invention is a temperature of from 280°F. to 370°F. in a closed vessel for 2 ½ to 5 minutes.

In one single preferred embodiment of this invention, this invention is accomplished by a process for producing a modified vegetable protein having properties similar to casein and caseinate salts, said process comprising:

A. making an aqueous slurry of a carbohydrate containing vegetable protein material, said vegetable protein material containing at least about 30 percent by weight protein; and said slurry containing from about 8 to 20 percent by weight solids;
B. pasteurizing the slurry by raising the temperature to above 290°F. for at least about 6 seconds and then cooling to a temperature below 65°F.;
C. adding to the cooled, pasteurized slurry from 0.1 to 5.0 percent by weight of the yeasts;
D. allowing the innoculated slurry to ferment until a substantial portion of the soluble carbohydrates have been converted thereby forming carbon dioxide; said fermentation being conducted at a temperature of from 33°F. to 90°F. for a time period of from 4 hours to 96 hours;
E. reacting the carbon dioxide with an alkali metal hydroxide or ammonium hydroxide to form a carbonate, said alkali metal hydroxide or ammonium hydroxide being added in an amount sufficient to adjust the pH to from about 7.0 to about 10.5;
F. heating the slurry to a temperature of from 300°–360°F. for a time period of from 1–10 minutes;
G. cooling the slurry to a temperature of from 50°F. to 90°F.;
H. neutralizing the slurry to a pH of from about 6.6 to 7.0 by addition thereto of an edible acid; and
I. drying the neutralized slurry to remove a substantial portion of the water therein.

The first step in this invention requires making an aqueous slurry of a carbohydrate containing vegetable protein material with the vegetable protein material containing at least about 30 percent by weight protein. Preferably the protein material is an oil seed, solvent extracted, vegetable protein such as soy protein isolate or soy protein concentrate. Other proteins, however, such as oat protein, have been found to be highly acceptable for use in this invention. Other oil seed vegetable proteins, solvent extracted to concentrate the protein therein are also acceptable, such as peanut and sesame protein and the other oil seed vegetable proteins. It is preferred that the protein material have at least about 30 percent by weight protein therein. In other words, the protein material should be concentrated so that it comprises a major portion of protein.

The aqueous slurry is prepared simply by adding the carbohydrate containing proteinaceous material to water and mixing until a slurry is provided. Preferably the slurry is prepared by mixing from 3–20 percent by weight of the proteinaceous material in water and mixing until slurry has occurred. This preferably gives an overall protein content in the slurry of up to about 12 percent by weight.

The next step in this invention requires fermenting the slurry with yeast to generate carbon dioxide. The fermentation is accomplished by adding carbon dioxide generating yeast to the slurry and reacting it under fermentation conditions to produce carbon dioxide.

For use herein, two particular strains of yeast have been found to be highly desirable. The yeasts *Saccharomyces cerevisiae* A.T.C.C. No. 7752 and *Saccharomyces carlsbergensis* have been found to be highly desirable for use in this invention. After the yeast has fermented the sugars therein and produced carbon dioxide, the slurry is preferably heated to pasteurize it and kill the yeast. After this is accomplished the slurry is then preferably cooled and an alkali metal hydroxide or ammonium hydroxide is added to form a carbonate being either an alkali metal carbonate or bicarbonate or ammonium carbonate. The addition of the hydroxide is such as to produce a slurry having a pH above 7.0 up to about 10.5. After the carbon dioxide has been converted into a carbonate the mixture is heated to react the carbonate with the protein. The heating must be sufficient to provide a reaction between the carbonate and the protein but must be below the decomposition temperature of the protein. We have found, for instance, a reaction temperature of 330°F. for a time period of from 160–200 seconds produces an acceptable product. We have found a reaction temperature of from 295°F. to 310°F. for from 3 ½ to 5 minutes produces a good product. Other times and temperatures may also be utilized providing the reaction product, when neutralized, has the same properties as is herein attributed to the above described reaction. It is well within the skill of one knowledgeable in the art to prepare these different products with different reactions in order to arrive at an end product, however, optimum conditions are as stated above. In any condition the temperature should be at least above the boiling point of water up to a point at which degradation of the protein material or reaction product occurs. It is preferable that the reaction be conducted in a closed vessel since this enables heating of the aqueous slurry above the boiling point of water. Generally this will raise the pressure and a reaction pressure of about 90 pounds per square inch is sometimes found.

At this point in the process, it is preferable to cool the reacted mass. This can be accomplished by conventional means to arrive at a temperature of from about room temperature to 130°F.

The next step in this invention requires the neutralizing of the slurry to a pH of from about 6.6 to 7.0 by addition thereto of an edible acid. The neutralization can occur by use of any of the known edible acids or edible alkalis which are normally used as food additives. For instance, hydrochloric acid, citric acid, formic acid, and acetic acid, are all members of the group of edible food grade acids acceptable for use in this invention. When the pH can be adjusted to the higher level, any edible alkali can be used such as sodium hydroxide, potassium hydroxide, calcium hydroxide, etc.

After the slurry has been neutralized it is then dried to remove a substantial portion of the water. Drying can occur in any of the known commercial processes such as drum drying, spray drying, or freeze drying, and all are acceptable for use in this invention.

DESCRIPTION OF THE PREFERRED EMBODIMENTS

This invention may be more fully described but is not limited by the following examples.

EXAMPLE 1

An aqueous slurry of 12 percent by weight soy flour is prepared by mixing the soy flour in water in the appropriate proportion. The yeasts *Saccharomyces cerevisiae* and *Saccharomyces carlsbergensis* are added thereto in a closed vessel and the slurry is fermented for 60 hours at 60°F. Sodium hydroxide is then added to the mixture until the pH is 8.0. The mixture is then heated to a temperature of 300°F. in a closed vessel for about five minutes. After heating the product is cooled to 120°F. and then neutralized by addition thereto of hydrochloric acid until the pH is 6.8. The product is then dried on a drum drier until the moisture content thereof is about 10 percent by weight. The product is admixed with 25–30 percent by weight protein to produce, when extruded, a fibular product in which the modified protein acts as a substitute for sodium caseinate.

EXAMPLE 2

Example 1 is repeated with the exception that the hydroxide is potassium hydroxide. Again, an acceptable product is produced.

EXAMPLE 3

Example 1 is repeated except the vegetable protein material is oat protein. Again, an acceptable product is produced.

EXAMPLE 4

Example 2 is repeated with the exception that the vegetable protein material is oat protein. Again, an acceptable product is produced.

EXAMPLE 5

Example 1 is repeated except the vegetable protein material is a mixture of 1 part by weight oat protein and 2 parts by weight soy flour. Again, an acceptable product is produced.

EXAMPLE 6

Example 1 is repeated except the vegetable protein material is a mixture of 1 part by weight sesame protein and 3 parts by weight soy flour. Again, an acceptable product is produced.

EXAMPLE 7

Example 1 is repeated except the vegetable protein material is a mixture of 1 part by weight peanut protein and 1 part by weight soy flour. Again, an acceptable product is produced.

EXAMPLE 8

Example 2 is repeated except the vegetable protein material is a mixture of 1 part by weight sesame protein and 3 parts by weight soy flour. Again, an acceptable sodium caseinate replacement is produced.

EXAMPLE 9

Example 2 is repeated except the vegetable protein material is a mixture of 1 part by weight peanut protein and 3 parts by weight soy flour. Again, an acceptable product is produced.

It may be seen that this invention provides a new and novel method for imparting the properties of casein and caseinate salts to vegetable proteins. The new modified protein has thermal reversability and the flow properties, gelling properties and fiber forming ability of caseinate containing products. The modified protein is found to be a highly acceptable substitute for sodium caseinate and casein in food products.

Having fully described this new and unique invention, we claim:

1. A process for producing a modified vegetable protein having properties similar to casein and caseinate salts, said process comprising:
   A. making an aqueous slurry of a carbohydrate containing vegetable protein material, said vegetable protein material containing at least about 30 percent by weight protein;
   B. fermenting the slurry with yeast to generate carbon dioxide, said fermentation being conducted at a temperature of from 33°F. to 90°F. for from 4 hours to 96 hours, and said yeast comprising a member selected from the group of yeast *Saccharomyces cerevisiae* and *Saccharomyces carlsbergenis*;
   C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5 said hydroxide being reacted with the carbon dioxide while in slurry;
   D. heating the aqueous slurry to react the carbonate with the protein said reacting occurring after the carbonate is created in situ;
   E. neutralizing the slurry to a pH of from about 6.6 to 7.0 by addition thereto of an edible acid or edible alkali; and
   F. drying the neutralized slurry to remove a substantial portion of the water therein.

2. A process as in claim 1 wherein the protein material is a solvent extracted oil seed vegetable protein.

3. A process as in claim 1 wherein the aqueous slurry has a solids content of from about 3 percent to 20 percent by weight.

4. A process as in claim 1 wherein the aqueous slurry has a protein content of up to about 12 percent by weight.

5. A process as in claim 1 wherein the hydroxide is a member selected from the group sodium hydroxide, potassium hydroxide, and ammonium hydroxide.

6. A process as in claim 1 wherein the heating step comprises heating the mixture to a temperature of from 260°F. to 370°F. in a closed vessel for from 2 to 5 minutes.

7. A process as in claim 1 wherein the vegetable protein material is soy flour.

8. A process as in claim 1 wherein the vegetable protein material is oat protein.

9. A process for producing a modified vegetable protein having properties similar to casein and caseinate salts, said process comprising:
   A. making an aqueous slurry of a carbohydrate containing vegetable protein material, said vegetable protein material containing at least about 30 percent by weight protein;
   B. fermenting the slurry with yeast to generate carbon dioxide, said fermentation being conducted at a temperature of from 33°F. to 90°F. for from 4 hours to 96 hours, and said yeast comprising a member selected from the group of yeast *Saccharomyces cerevisiae* and *Saccharomyces carlsbergensis*;
   C. reacting the carbon dioxide with an alkali metal hydroxide or ammonium hydroxide to form a carbonate, said hydroxide being added in an amount sufficient to adjust the pH of the carbonate containing slurry to from about 7.0 to about 10.5 said hydroxide being reacted with the carbon dioxide while in slurry;
   D. heating the aqueous slurry to react the carbonate with the protein said reacting occurring after the carbonate is created in situ;
   E. cooling the reacted protein slurry to a temperature below about 130°F;
   F. neutralizing the slurry to a pH of from about 6.6 to 7.0 by addition thereto of an edible acid; and
   G. drying the neutralized slurry to remove a substantial portion of the water therein.

10. A process for producing a modified vegetable protein having properties similar to casein and caseinate salts, said process comprising:
   A. making an aqueous slurry of a carbohydrate containing vegetable protein material; said vegetable protein material containing at least about 30 percent by weight protein; and said slurry containing from about 8–20 percent by weight solids;
   B. pasteurizing the slurry by raising the temperature to about 290°F. for at least about 6 seconds and then cooling to a temperature below 65°F;
   C. adding to the cooled, pasteurized slurry from 0.1 to 5.0 percent by weight yeast, said yeast comprising a member selected from the group of yeasts *Saccharomyces cerevisiae* and *Saccharomyces carlsbergensis*;
   D. allowing the innoculated slurry to ferment until a substantial portion of the soluble carbohydrates have been converted thereby forming carbon dioxide; said fermenting being conducted at a temperature of from 33°F. to 90°F. for a time period of from 4 to 96 hours;
   E. reacting the carbon dioxide with an alkali metal hydroxide of ammonium hydroxide to form a carbonate; said alkali metal hydroxide or ammonium hydroxide being added in an amount sufficient to adjust the pH of the carbonate containing slurry to from about 7.0 to about 10.5;
   F. heating the slurry to a temperature of from 300° to 360°F. for a time period of from 1 to 10 minutes;
   G. cooling the slurry to a temperature of from 50° to 90°F;
   H. neutralizing the slurry to a pH of from about 6.6 to 7.0 by addition thereto of an edible acid or edible alkali; and
   I. drying the neutralized slurry to remove a substantial portion of water therein.

* * * * *